Patented Nov. 23, 1937

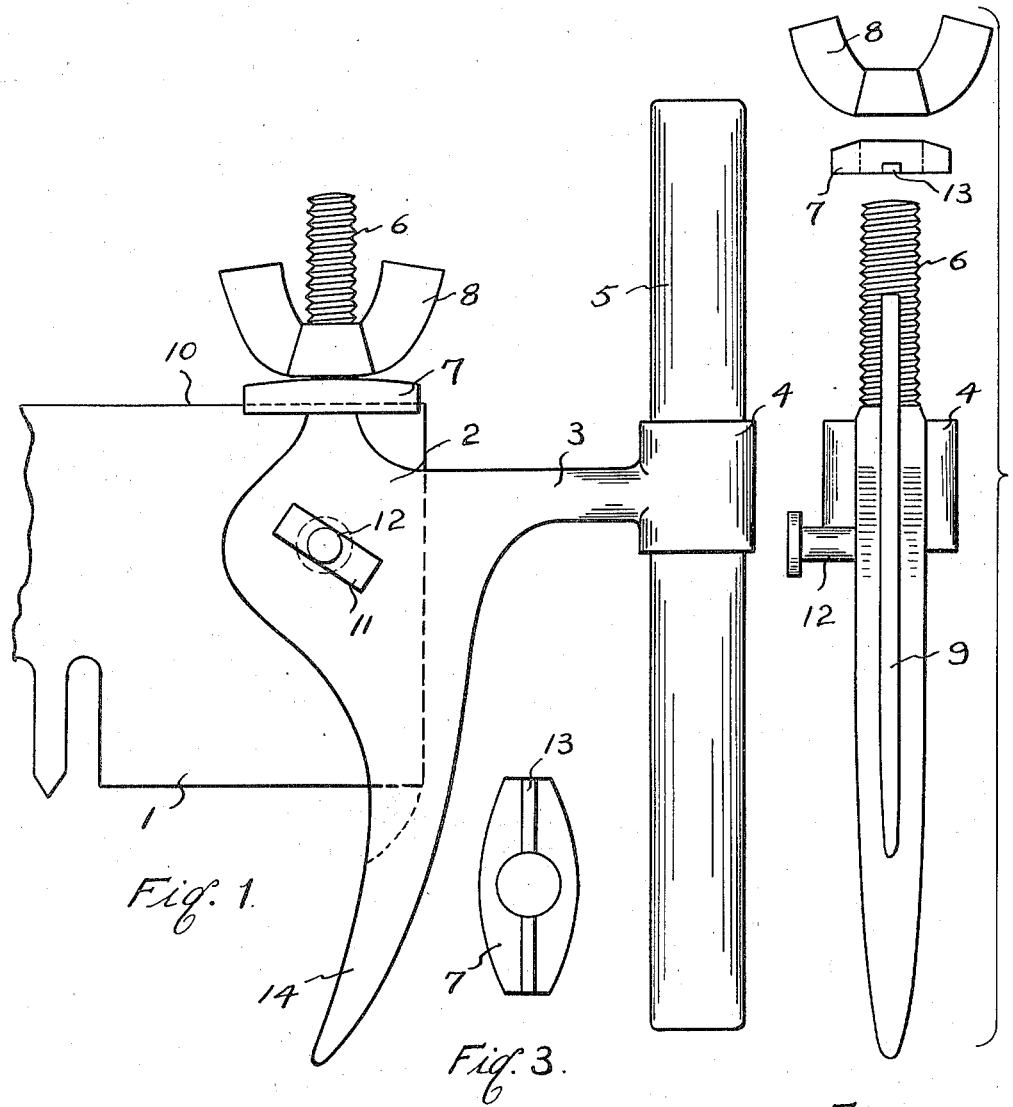

2,099,966

UNITED STATES PATENT OFFICE 2,099,966

CROSSCUT SAW HANDLE

Donald J. E. Smith, Vancouver, British Columbia, Canada, assignor to Joseph E. Whitten, Vancouver, British Columbia, Canada Application December 15, 1936, Serial No. 116,021

2 Claims. (Cl. 145—111)

This invention relates to improvements in cross-cut saw handles designed to render such handles more rigid and substantial in use than other such handles.

I am aware that there has been a large number of patents granted upon various types of saw handles, amongst which is United States Patent No. 1,769,535, granted to Viktor Nylund on July 1st, 1930, which covers a saw handle having a locking head operatable in a slide formed in the body of the saw handle.

The locking head has an inclined or angularly disposed groove formed in the lower end in which is mounted a locking pin for insertion in an eye atable in a slide formed in the body of the haning head is tensioned in its slide formed in the body of the saw handle by a wing nut threaded upon the threaded stem of the locking head.

The construction of this particular type of saw handle is complicated and expensive and it is one of the principal objects of my invention to improve upon the afore-recited patent and simplify and provide a more rigid and substantial handle than the one above described.

My invention has important points of difference of construction from the afore-recited patent, one of the principal of which is that the saw blade is secured into the main body portion of the handle and not in a sliding element operatable in a slide formed in the body of the handle as in the Nylund patent.

By the elimination of the locking head, as found in the Nylund patent, substantial economies of manufacturing costs are effected, as several manufacturing operations are avoided and a part dispensed with.

Another particular object of my invention is to provide a one-piece saw handle that has no auxiliary parts with the exception of the locking pin, wing nut, clamp and wood handle.

A further object of my invention is to provide a saw handle having no movable parts in the main body of the saw handle, always excepting the wing nut, clamp and locking pin.

Another particular object of my invention has been to provide a more simplified and rigid handle than those generally in use and one economical to manufacture.

With these and other objects in view, I have invented the saw handle that is the subject matter of this application, and which is further described in the following detailed specification and illustrated in the accompanying drawing forming part of this application, and in which:

Figure 1 is a side view of saw handle shown attached to the end of a cross-cut saw blade.

Figure 2 is a front end view of saw handle showing the slot formed in the main body of the handle and a portion of the threaded stem. The clamp washer and wing nut are shown removed for purposes of clarity. The locking pin is shown projecting from side of handle.

Figure 3 is a plan view of the under side of the clamp washer showing the shallow slot formed therein for registering upon the back edge of the saw blade.

In this drawing like reference characters indicate like parts throughout and the numeral 1 indicates the end of a saw blade to which is attached a flat-sided saw handle 2 having a shank 3 on the end of which is formed a handle socket 4 for the reception of the wooden handle 5.

Formed integrally with the handle 2 is a vertically threaded stem 6 having a clamp washer 7 and wing nut 8 fitting the same.

The handle 2 has a slot 9 formed therein extending rearwardly into the body of the handle for the reception of a saw blade therein.

The slot 9 pierces the lower end of the vertical stem 6 whereby the back edge 10 of the saw blade may be engaged by the clamp 7 and wing nut 8.

Formed in and through the flat sided saw handle 2 is an inclined or angularly disposed slot 11 having a loosely mounted locking pin 12 secured therein, adapted to engage with an eye formed in the end of the saw blade 1.

The clamp washer 7 fitting the threaded stem 6 is preferably provided with a shallow slot 13 in the bottom thereof for engagement upon the back edge 10 of the saw blade.

The handle 2 may be provided with a lower and extending guard 14, if desired, as illustrated in Figure 1.

In use and operation the handle 2 may be brought into rigid engagement with a saw blade by mounting the handle 2 upon the end of a cross-cut saw blade 1 and positioning the locking pin 12 into the usual eye formed in the ends of the saw blade and then, by manipulation of the wing nut 8 upon the threaded stem 6, the clamp washer 7 is compressed upon the back edge 9 of the saw blade which forces the saw blade down upon the locking pin 12 and by virtue of the inclined slot 11 the pin 12 is forced rearwardly downwards into the slot 11 by the compressive action upon the back of the same which brings the saw handle 2 into rigid engagement with the saw blade 1.

It is to be particularly noted that, other than the locking pin 12 and clamp washer 7 and wing nut 8, there are no auxiliary parts used to secure the handle 2 rigidly to a saw blade and my invention is devoid of all extraneous and moving parts such as locking heads and slide members.

Having now described my invention, what I claim and desire to be protected in, by Letters Patent, is:

1. In combination with a saw blade having an eye in the ends thereof, a saw handle having a flat-sided body member and a vertical threaded stem integral therewith, a slot formed in said body member and in the lower portion of said threaded stem to permit said body member and lower portion of said stem to engage directly with said saw blade, an angularly disposed slot formed in and through said body member, a loosely mounted pin in said angular slot adapted to engage with the eye in said saw blade, a clamp washer having a shallow slot formed upon its lower side for engagement with the back edge of said saw blade, and means on said threaded stem to compress said clamp washer upon said saw blade after the eye of said saw blade has been engaged by the loosely mounted pin in said angular slot whereby said handle is brought into rigid engagement with said saw blade.

2. In combination with a saw blade having an eye in the ends thereof, a saw handle having a flat-sided body member integral with a vertical threaded stem, a clamp washer and wing nut fitting said stem, said clamp washer adapted to engage with the back edge of said saw blade and be compressed thereagainst by said wing nut, a slot formed in said body member and through the lower portion of said vertical stem to permit said body member and stem to engage directly with said saw blade, an angularly disposed slot formed in and through said flat-sided body member, a locking pin mounted in said angular slot adapted to engage with the eye in said saw blade whereby said handle may be brought into rigid engagement with said saw blade by compression of the clamp washer upon the back edge of said saw blade by said wing nut.

DONALD J. E. SMITH.